(12) United States Patent
Park et al.

(10) Patent No.: US 11,296,416 B2
(45) Date of Patent: Apr. 5, 2022

(54) METAMATERIAL STRUCTURE ANTENNA AND METAMATERIAL STRUCTURE ARRAY

(71) Applicants: Samsung Electronics Co., Ltd., Gyeonggi-do (KR); Hongik University Industry-Academia Cooperation Foundation, Seoul (KR)

(72) Inventors: Jae-Seok Park, Gyeonggi-do (KR); Jeong-Hae Lee, Seoul (KR); Jae-Hyun Park, Gyeonggi-do (KR); Kwi-Seob Um, Seoul (KR); Young-Ho Ryu, Gyeonggi-do (KR); Chang-Hyun Lee, Incheon (KR); Sang-Wook Kwon, Gyeonggi-do (KR); Sung-Bum Park, Gyeonggi-do (KR); Jae-Gon Lee, Gyeonggi-do (KR); Sang-Wook Chi, Incheon (KR)

(73) Assignees: Samsung Electronics Co., Ltd; Hongik University Industry-Academica Cooperation Foundation

( * ) Notice: Subject to any disclaimer, the term of this patent is extended or adjusted under 35 U.S.C. 154(b) by 265 days.

(21) Appl. No.: 16/608,621

(22) PCT Filed: Apr. 19, 2018

(86) PCT No.: PCT/KR2018/004537
§ 371 (c)(1),
(2) Date: Oct. 25, 2019

(87) PCT Pub. No.: WO2018/199549
PCT Pub. Date: Nov. 1, 2018

(65) Prior Publication Data
US 2020/0052405 A1   Feb. 13, 2020

(30) Foreign Application Priority Data

Apr. 25, 2017 (KR) .......................... 10-2017-0052988

(51) Int. Cl.
*H01Q 9/04* (2006.01)
*H01Q 1/48* (2006.01)
(Continued)

(52) U.S. Cl.
CPC .......... *H01Q 9/0428* (2013.01); *H01Q 1/243* (2013.01); *H01Q 1/245* (2013.01); *H01Q 1/48* (2013.01); *H01Q 3/36* (2013.01); *H01Q 15/148* (2013.01)

(58) Field of Classification Search
CPC .............. H01Q 9/0428; H01Q 19/005; H01Q 15/0086; H01Q 15/148; G02F 2202/30
See application file for complete search history.

(56) References Cited

U.S. PATENT DOCUMENTS

| 2012/0075692 A1* | 3/2012 | Baik ......................... G02F 1/21 359/344 |
| 2013/0176188 A1 | 7/2013 | Motta Cruz |

(Continued)

FOREIGN PATENT DOCUMENTS

| CN | 106165196 A  * | 11/2016 | ........... H01Q 19/005 |
| EP | 1038332 B1 * | 4/2008 | ............. H01Q 5/378 |

(Continued)

OTHER PUBLICATIONS

PCT/ISA/210 Search Report issued on PCT/KR2018/004537, pp. 5.
PCT/ISA/237 Written Opinion issued on PCT/KR2018/004537, pp. 5.

*Primary Examiner* — Ricardo I Magallanes
(74) *Attorney, Agent, or Firm* — The Farrell Law Firm, P.C.

(57) ABSTRACT

In various embodiments, a metamaterial structure antenna may comprise: a feed line for feeding a signal; a ground plane comprising a cross-shaped aperture forming circular polarization on the basis of a magnetic field induced by the (Continued)

fed signal; and a patch plane formed parallel to the ground plane which emits electromagnetic waves on the basis of the circular polarization.

13 Claims, 9 Drawing Sheets

(51) Int. Cl.
    *H01Q 15/14*     (2006.01)
    *H01Q 1/24*     (2006.01)
    *H01Q 3/36*     (2006.01)

(56) References Cited

U.S. PATENT DOCUMENTS

| | | |
|---|---|---|
| 2013/0222200 A1 | 8/2013 | Ju |
| 2015/0042526 A1 | 2/2015 | Zeine |
| 2015/0333413 A1* | 11/2015 | Piazza ................... H01Q 3/24 342/374 |
| 2016/0020647 A1 | 1/2016 | Leabman et al. |

FOREIGN PATENT DOCUMENTS

| | | |
|---|---|---|
| JP | 5998144 | 9/2016 |
| KR | 1020020061208 | 7/2002 |
| KR | 20100034327 | 4/2010 |
| KR | 1020130098098 | 9/2013 |
| KR | 101444017 | 9/2014 |

\* cited by examiner

METAMATERIAL STRUCTURE ANTENNA AND METAMATERIAL STRUCTURE ARRAY

PRIORITY

This application is a National Phase Entry of International Application No. PCT/KR2018/004537, which was filed on Apr. 19, 2018, and claims priority to Korean Patent Application No. 10-2017-0052988, which was filed on Apr. 25, 2017, the content of each of which is incorporated herein by reference.

TECHNICAL FIELD

The disclosure relates to a meta-structure antenna for improving steering performance and antenna gain and an array antenna including a plurality of meta-structure antennas.

BACKGROUND ART

Recently, in the field of 5G communication technology and microwave wireless power transmission technology, high-efficiency array antenna design technology for realizing long-distance communication and wireless power transmission is required. In particular, unlike 4G communication technology using a frequency band of 3 GHz or less, in 5G communication technology, a band from at least 5 GHz up to the millimeter wave band of 30 GHz or higher is considered as a communication band.

Accordingly, in order to overcome transmission loss in the air due to the use of high frequencies, it may be necessary to use an array antenna for adjusting a communication range. In this case, the steering performance and antenna gain of the array antenna for determining the communication range may be used as an important performance indicator.

For example, unlike the existing magnetic induction method or magnetic resonance method, the wireless power transmission method using microwaves enables remote power transmission up to several meters. In this case, the transmission efficiency may be directly related to the gain of the antenna. In addition, when charging is performed by tracking the location of a charging device, steering performance may be an important performance index in antenna design for wireless power transmission.

Accordingly, research for improving steering performance and antenna gain is actively being conducted.

DETAILED DESCRIPTION OF THE INVENTION

Technical Problem

The technical problem to be solved by the disclosure is to minimize gain deterioration depending on a steering angle appearing in the design of an existing antenna and to design an antenna having high gain in a wide steering range.

In addition, an object is to improve the deterioration in the gain caused by the interference between unit antennas constituting an array antenna.

In addition, an object is to propose a high-gain antenna that overcomes the limitation of gain theoretically determined depending on the area of the array antenna.

That is, the technical problem to be solved by the disclosure is to expand the operating range of a 5G communication and radio power transmission system and to improve the transmission efficiency using an antenna having a novel structure.

The technical problems to be solved by the disclosure are not limited to those described above, and other technical problems, which are not described above, may be clearly understood by a person ordinarily skilled in the related art, to which this disclosure belongs.

Technical Solution

A meta-structure antenna of this disclosure may include: a feed line configured to feed a signal; a ground plane including a cross-shaped aperture, the ground plane being configured to form circularly polarized waves based on a magnetic field induced by the fed signal; and a patch plane disposed parallel to the ground plane, the patch plane being configured to radiate electromagnetic waves based on the circularly polarized waves.

According to various embodiments, the meta-structure antenna may further include a plurality of vias formed between the ground plane and the patch plane to produce zeroth-order resonance in the meta-structure antenna. When the patch plane is divided into a plurality of partial patch planes, the numbers of one or more vias formed between respective partial patch planes and the ground plane may be equal to each other. In this case, the numbers of one or more vias may be three, four, or five.

According to various embodiments, the meta-structure antenna may further include a superstrate configured to radiate electromagnetic waves improved in directional gain by adjusting a phase and an amplitude of the radiated electromagnetic waves. The superstrate may include a first cover and a second cover spaced apart from the first cover by a predetermined distance. The length of one side of the superstrate may be equal to the length of one side of the ground plane. In addition, the first cover and the second cover may respectively include a first pattern and a second pattern, which are configured to adjust the phase and the amplitude of the radiated electromagnetic waves. The sizes of the first pattern and the second pattern may be different from each other, and in particular, the first pattern and the second pattern may be circular. In this case, the sizes of the first pattern and the second pattern may be determined in consideration of the magnitude of a reflection coefficient with respect to the superstrate and the phase of the reflected waves, or in consideration of the magnitude of a transmission coefficient with respect to the superstrate and the phase of the transmitted waves. The distance between the first cover and the second cover may be determined in consideration of the magnitude of a reflection coefficient with respect to the superstrate and the phase of the reflected waves or in consideration of the magnitude of a transmission coefficient with respect to the superstrate and the phase of the transmitted waves.

According to various embodiments, the patch plane may include a cross-shaped gap. The cross-shaped gap may be located to correspond to the cross-shaped aperture in the ground plane.

In various embodiments, the cross-shaped aperture of the ground plane may be a plurality of slits orthogonal to each other, and the plurality of slits may have different lengths so as to form circularly polarized waves. At this time, the ground plane may be a rectangular flat structure.

In addition, a meta-structure array antenna of this disclosure may include a plurality of meta-structure antennas including meta-material unit cells. Each of the meta-structure antennas may include: a feed line configured to feed a signal; a ground plane including a cross-shaped aperture, the ground plane being configured to form circularly polarized waves on the basis of a magnetic field induced by the fed signal; and a patch plane disposed parallel to the ground plane, the patch plane being configured to radiate electromagnetic waves on the basis of the circularly polarized waves.

Advantageous Effects

When using a meta-structure antenna including a meta-material unit cell according to an exemplary embodiment of this disclosure, gain deterioration during steering may be suppressed compared with an array antenna including an existing microstrip patch antenna. In addition, when adding a superstrate structure having a two-layer cover to the meta structure antenna, the gain of the array antenna can be further improved.

Accordingly, it is possible to maximize the wireless power transmission efficiency and to extend a 5G communication range, and thus it is possible to actively utilize the antenna structure of this disclosure in technologies in which the antenna gain and steering performance are important.

In addition, when a superstrate having a two-layer cover is provided, it is easy to adjust the phase and magnitude of a transmission coefficient and a reflection coefficient. Thus, it is possible to widely use the antenna structure in the field in which the precise adjustment of the transmission coefficient and reflection coefficient of, for example, a reflector and a lens, is required.

The effects that can be obtained by this disclosure are not limited to those described above and other effects, which are not described above, may be clearly understood by a person ordinarily skilled in the art, to which this disclosure belongs.

MODE FOR CARRYING OUT THE INVENTION

Figure 1:
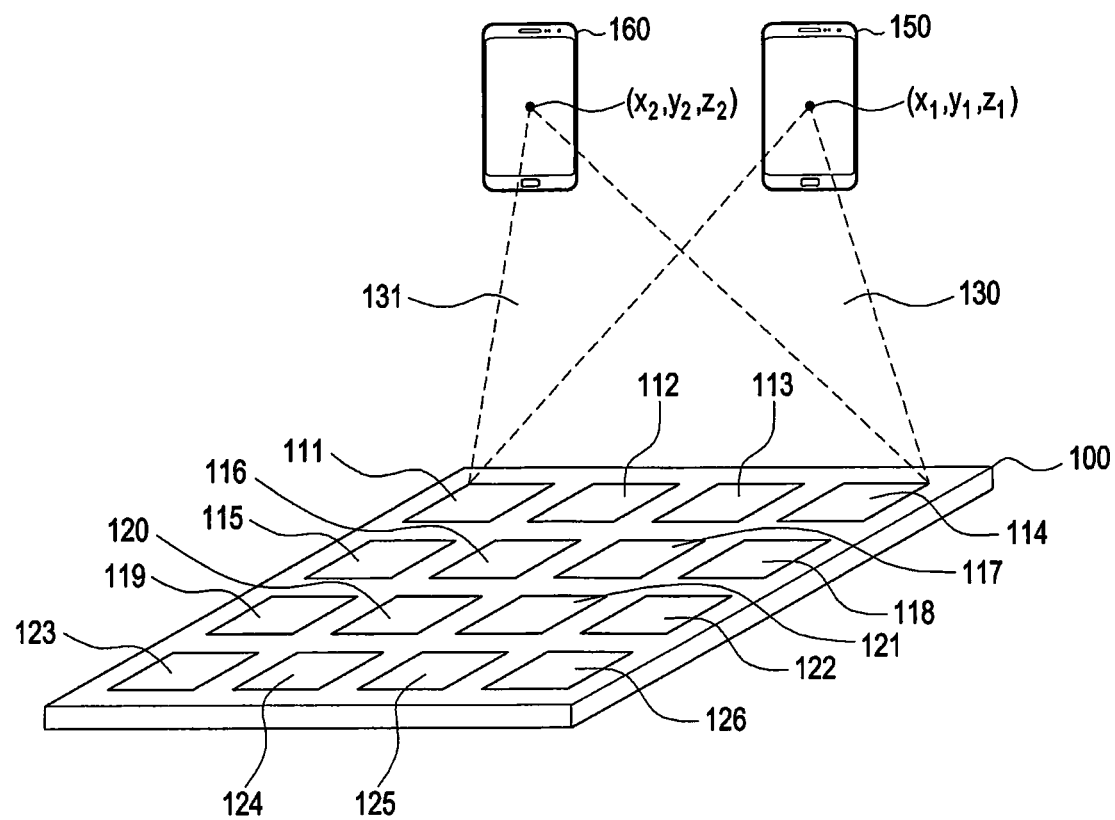
FIG. 1 is a conceptual view of a wireless power transmission system according to various embodiments of the disclosure.

Hereinafter, various embodiments of the disclosure will be described with reference to the accompanying drawings.

In describing the drawings, similar reference numerals may be used to designate similar constituent elements. A singular expression may include a plural expression unless they are definitely different in a context. As used herein, singular forms may include plural forms as well unless the context clearly indicates otherwise. The expression "a first", "a second", "the first", or "the second" may modify various elements regardless of the order and/or the importance, and is used merely to distinguish one element from another element without limiting the corresponding elements. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

According to various embodiments of the disclosure, an array antenna device including an array antenna for transmitting wireless power may include at least one of, for example, a smartphone, a tablet PC, a mobile phone, a video phone, an e-book reader, a desktop PC, a laptop PC, a netbook computer, a workstation, a server, a PDA, a portable multimedia player (PMP), an MP3 player, a medical device, a camera, or a wearable device. The wearable device may include an accessory-type wearable device (e.g., a watch, a ring, a bracelet, an ankle bracelet, a necklace, spectacles, a contact lens, or a head-mounted-device (HMD)), a fabric or cloth-integrated type wearable device (e.g., an electronic cloth), a body attachment type wearable device (e.g., a skin pad), or an implantable circuit. In some embodiments, the array antenna device may include at least one of a television, a digital video disk (DVD) player, an audio set, a refrigerator, an air conditioner, an air cleaner, an oven, a microwave oven, a washing machine, an air purifier, a set-top box, a home automation control panel, a security control panel, a media box, a game console, an electronic dictionary, an electronic key, a camcorder, or an electronic picture frame.

In another embodiment, the array antenna device may include at least one of various medical devices (e.g., various potable medical measurement devices (a blood glucose monitor, a heart rate monitor, a blood pressure monitor, or a clinical thermometer), a magnetic resonance angiography (MRA) device, a magnetic resonance imaging (MRI) device, a computed tomography (CT) device, a moving picture camera, or an ultrasonic device), a navigation system, a global navigation satellite system (GNSS), an event data recorder (EDR), a flight data recorder (FDR), an automobile infotainment device, a ship electronic device (e.g., a ship navigation system or a gyro compass), an avionics device, a security device, a vehicle head unit, an industrial or home robot, a drone, an Automated Teller Machine (ATM), a Point Of Sale (POS) terminal, or IoT devices (e.g., a bulb, various sensors, a sprinkler device, a fire alarm, a thermostat, a street lamp, a toaster, exercise equipment, a hot water tank, a heater, and a boiler). According to some embodiments, the array antenna device may include at least one of furniture, part of a building/structure or an automobile, an electronic board, an electronic signature receiving device, a projector, and various measuring instruments (e.g., a water supply, electricity, gas, or electromagnetic wave measurement instrument). In various embodiments, the array antenna device may be flexible or may be a combination of two or more of various devices described above. The array antenna device according to an embodiment of the disclosure is not limited to the devices described above. In this disclosure, the term "user" may refer to a person who uses an array antenna device or a device that uses an array antenna device (e.g., an artificial intelligence electronic device).

FIG. 1 is a conceptual view of a wireless power charging system according to various embodiments of the disclosure.

The array antenna device 100 may transmit power to the at least one electronic device 150 or 160 in a wireless manner. In various embodiments of the disclosure, the array antenna device 100 may include a plurality of patch antennas 111 to 126. The patch antennas 111 to 126 are not limited as long as each of the patch antennas is antenna capable of generating electromagnetic waves. The electromagnetic waves may include, for example, radio frequency (RF) waves, microwaves, or millimeter waves in a 5G communication band. At least one of the amplitude and phase of the electromagnetic waves emitted by the patch antennas 111 to 126 may be adjusted by a wireless power transmitter 100. For convenience of description, the electromagnetic waves generated by each of the patch antennas 111 to 126 will be referred to as sub-electromagnetic waves. Here, the patch antenna may include a meta-structure antenna including a patch for radiating electromagnetic waves according to the disclosure.

In various embodiments of the disclosure, the array antenna device 100 may adjust at least one of the amplitude and the phase of each of the sub-electromagnetic waves generated by the patch antennas 111 to 126. Meanwhile, the sub-electromagnetic waves may interfere with each other. For example, the sub-electromagnetic waves may constructively interfere with each other at any one point, and may destructively interfere with each other at another point. In various embodiments of the disclosure, the array antenna device 100 may adjust at least one of the amplitude and the phase of the sub-electromagnetic waves generated by the patch antennas 111 to 126 such that the sub-electromagnetic waves constructively interfere with each other at a first point (x1, y1, z1).

For example, the array antenna device 100 may detect that an electronic device 150 is disposed at the first point (x1, y1, z1). Here, the position of the electronic device 150 may be, for example, a point at which a power reception antenna of the electronic device 150 is located. In order for the electronic device 150 to receive power in a wireless manner with high efficiency, it is necessary for the sub-electromagnetic waves to constructively interfere with each other at the first point (x1, y1, z1). Accordingly, the array antenna device 100 may control the patch antennas 111 to 126 such that the sub-electromagnetic waves constructively interfere with each other at the first point (x1, y1, z1). Here, controlling the patch antennas 111 to 126 may mean controlling the magnitude of a signal input to the patch antennas 111 to 126 or controlling the phase (or delay) of the signal input to the patch antennas 111 to 126. In more detail, the array antenna device 100 may control at least one of an amplifier and a phase shifter included in or connected to the patch antennas 111 to 126 so as to control at least one of the magnitude and the phase of a signal input to the patch antennas 111 to 126. Meanwhile, a person ordinarily skilled in the art may readily understand beamforming, which is a technique for controlling RF waves to constructively interfere with each other at a specific point. In addition, a person ordinarily skilled in the art may also easily understand that there is no limitation on the type of beamforming used in this disclosure.

Electromagnetic waves 130 formed by the sub-electromagnetic waves may have a maximum amplitude at the first point (x1, y1, z1), and thus the electronic device 150 may receive wireless power with high efficiency. Meanwhile, the array antenna device 100 may detect that an electronic device 160 is disposed at a second point (x2, y2, z2). Accordingly, in order to charge the electronic device 160, the array antenna device 100 may control the patch antennas 111 to 126 such that the sub-electromagnetic waves constructively interfere with each other at the second point (x2, y2, z2). Accordingly, electromagnetic waves 131 formed by the sub-electromagnetic waves may have a maximum amplitude at the second point (x2, y2, z2), and thus the electronic device 160 may receive power in a wireless manner with high efficiency.

In more detail, the electronic device 150 may be disposed on the relatively right side. In this case, the array antenna device 100 may apply a larger delay to sub-electromagnetic waves formed from patch antennas (e.g., the patch antennas 114, 118, 122, and 126) disposed relatively on the right side. That is, after the sub-electromagnetic waves are first formed from the patch antennas (e.g., the patch antennas 111, 115, 119, and 123) disposed relatively on the left side, the sub-electromagnetic waves may be generated from the patch antennas (e.g., the patch antennas 114, 118, 122, and 126) arranged on the right side after a predetermined time passes. Accordingly, the sub-electromagnetic waves may simultaneously meet at a point on the relatively right side, that is, the sub-electromagnetic waves may constructively interfere at a point on the relatively right side. If beamforming is performed in a relatively central area, the array antenna device 100 may apply substantially the same delay to the patch antennas on the left side (e.g., the patch antennas 111, 115, 119, and 123) and the patch antennas on the right side (e.g., the patch antennas 114, 118, 122, and 126). In addition, if beamforming is performed at a relatively left point, the array antenna device 100 may apply a larger delay to the patch antennas on the left side (e.g., the patch antennas 111, 115, 119, and 123) than to the patch antennas on the right side (e.g., the patch antennas 114, 118, 122, and 126). Meanwhile, in another embodiment, the array antenna device 100 may oscillate sub-electromagnetic waves substantially simultaneously at all the patch antennas 111 to 126, and may perform beamforming by adjusting a phase corresponding to the delay described above.

As described above, the array antenna device 100 may determine the positions of the electronic devices 150 and 160 and may cause the sub-electromagnetic waves to constructively interfere with each other at the determined position, thereby performing wireless charging with high transmission efficiency.

Figure 2:
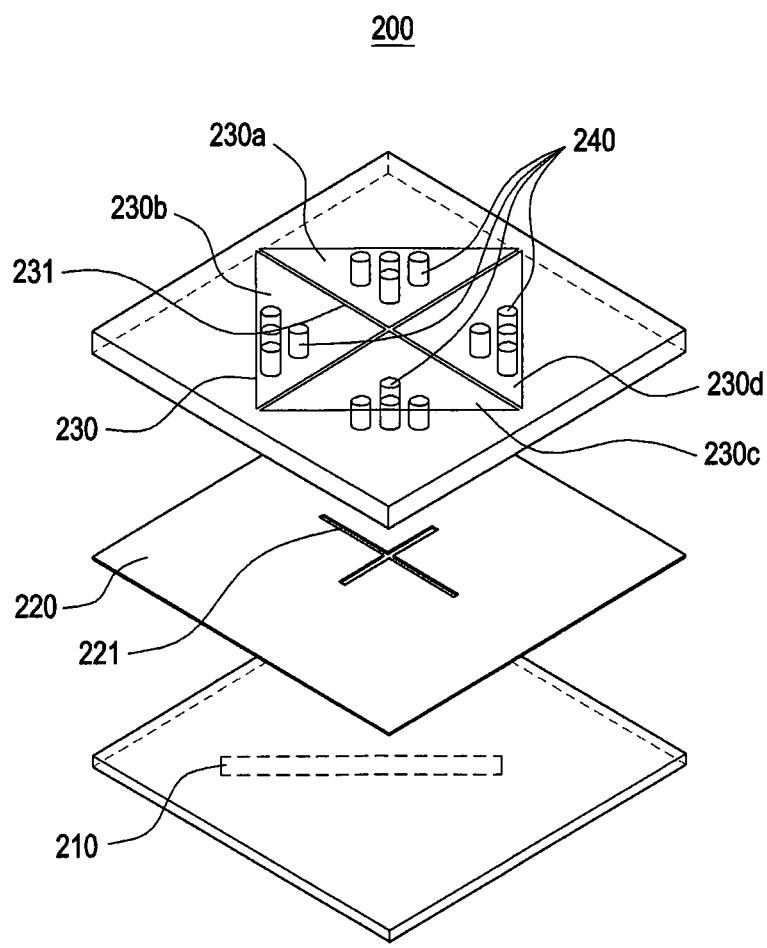
FIG. 2 is a view illustrating a meta-structure antenna according to an embodiment of the disclosure.

FIG. 2 is a view illustrating a meta-structure antenna 200 according to an embodiment of the disclosure.

Unlike a microstrip patch antenna that forms electromagnetic waves based on the physical length of an existing transmission line, the meta-structure antenna 200 may be an antenna designed on the basis of a composite right/left-handed (CRLH) transmission line composed of unit cells each having a meta-material structure having a periodic gap, an epsilon negative (ENG) transmission line, or a mu negative (MNG) transmission line. When opposite ends of a unit cell are shorted to a ground plane irrespective of the physical length of the transmission line, a meta-material antenna forms electromagnetic waves according to a zeroth-order resonance characteristic having an infinite wavelength at a specific frequency. Therefore, the meta-material antenna is very advantageous for the miniaturization of the antenna.

In FIG. 2, the meta-structure antenna 200 of the disclosure may include a feed line 210, a ground plane 220, and a patch plane 230.

The feed line 210 may transmit a signal to a radiator for signal radiation. The feed line 210 may have a stripline structure, a microstrip structure, an embedded coplanar waveguide structure, or the like, but is not limited to the above-described example.

The feed line 210 may be provided on a substrate, and the substrate may have a laminated structure including a plurality of layers as a collection of planar dielectrics or insulators. The substrate may be a component that enables electrical connection between electronic components with high density, low cost, high reliability, and high productivity. As an example, the substrate may include a printed circuit board (PCB).

The feed line 210 may supply a signal via a coupling feed method or a direct feed method.

The ground plane 220 may form circularly polarized waves on the basis of the supplied signal. For example, when feeding is performed via the coupling feed method, the ground plane 220 may form circularly polarized waves on the basis of a magnetic field induced from a signal. In this case, the ground plane 220 may include an aperture 221 having a cross shape (or a cross-shaped aperture) to form circularly polarized waves.

The cross-shaped aperture 221 may include a plurality of slits that are linear thin rectangles orthogonal to each other. In this case, the plurality of slits may have different lengths to form circularly polarized waves. That is, the lengths of the plurality of slits may be designed asymmetrically.

The ground plane 220 may have a square flat structure, but may be variously modified as necessary.

The patch plane 230 is a portion corresponding to antenna patches, and may radiate electromagnetic waves. The patch plane 230 may be disposed in parallel with the ground plane 220.

The patch plane 230 may include a gap 231 in the form of a cross. When the patch plane 230 includes a plurality of partial patch planes 230a, 230b, 230c, and 230d, the partial patch planes 230a, 230b, 230c, and 230d may be disposed to be adjacent to each other with the gap 231 interposed therebetween. In this case, as the width of the gaps decreases, the value of the series capacitance of the equivalent circuit of the meta-structure antenna 200 increases, and thus the resonance frequency of the meta-structure antenna 200 may increase.

The cross-shaped gap 231 in the patch plane 230 may be positioned to correspond to the cross-shaped aperture 221 of the ground plane 220. That is, the center of the cross-shaped gap 231 in the patch plane 230 may be located on the same vertical line as the center of the cross-shaped aperture 221 in the ground plane 220. In addition, assuming that the cross-shaped gap in the patch plane 230 extends into a vertical plane, the vertical plane may extend through the cross-shaped aperture 221 in the ground plane 220.

A plurality of vias 240 may be formed between the patch plane 230 and the ground plane 220 in order to generate zeroth-order resonance in the meta-structure antenna 200. The plurality of vias 240 may connect a portion of the patch plane 230 and a portion of the ground plane 220 to each other so as to form a short-ended state.

When the patch plane 230 includes a plurality of partial patch planes 230a, 230b, 230c, and 230d, the numbers of one or more vias formed between respective partial patch planes 230a, 230b, 230c, and 230d and the ground plane 220 may be the same.

In addition, three, four, or five vias may be formed between one of the plurality of partial patch planes 230a, 230b, 230c, and 230d and the ground plane 220. In this case, as the distance between the plurality of vias increases, the parallel inductance value of the equivalent circuit of the meta-structure antenna 200 may decrease, and as the distance between the plurality of vias decreases, the parallel inductance value of the equivalent circuit of the meta-structure antenna 200 may increase.

Figure 3:
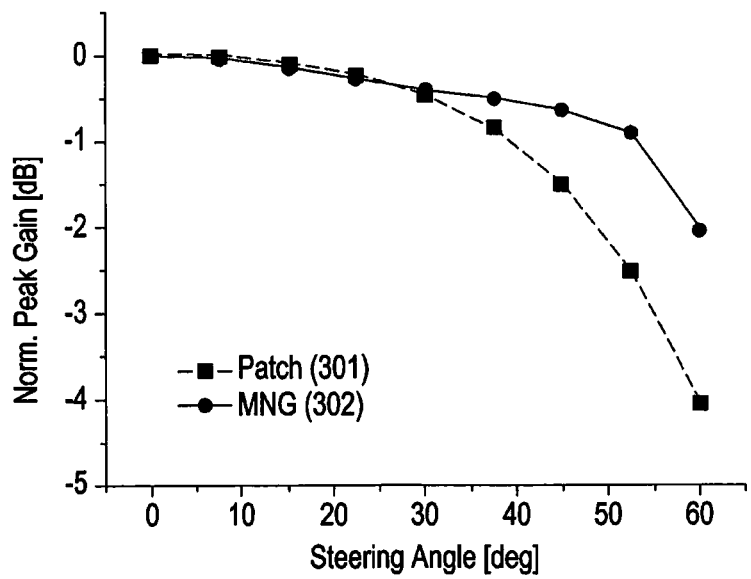
FIG. 3 is a view representing the steering characteristics of a meta-structure array antenna according to an embodiment of the disclosure.

FIG. 3 is a view representing the steering characteristics of a meta-structure array antenna according to an embodiment of the disclosure.

FIG. 3 represents a result obtained by comparing the steering gains of a meta-structure array antenna and an existing microstrip array antenna.

The meta-structure array antenna refers to an antenna having a structure, in which meta-structure antennas are arranged using the meta-structure antenna of FIG. 2 as a unit antenna. In addition, the microstrip array antenna refers to an antenna having a structure, in which existing microstrip patch antennas are arranged as unit antennas.

Of course, meta-structure antennas having various arrangements using the meta-structure antenna of FIG. 2 as a unit antenna may be designed. For example, a meta-structure array antenna may include a plurality of meta-structure antennas in a linear array of 1×A, a planar array of A×B, or a 3D or circular array of A×B×C.

In FIG. 3, the x axis represents the steering angle and the y axis represents the steering gain of the array antenna.

In this case, the dotted line graph 301 represents the change in the steering gain depending on the steering angle of a microstrip array antenna in which the existing microstrip patch antennas are arranged in a 1×8 array. In addition, the solid line graph 302 represents the change in the steering gain depending on the steering angle of a meta-structure array antenna in which the meta-structure antennas of this disclosure are arranged in a 1×8 array.

According to FIG. 3, it is confirmed that when the steering angle increases, the reduction width in the steering gain of the meta-structure array antenna corresponding to the solid line graph 302 has a gentle slope compared with the reduction width in the steering gain of the microstrip array antenna corresponding to the dotted line graph 301.

For example, the steering angle at which the gain is reduced by −3 dB may be 63 degrees in the case of the meta-structure array antenna, but may be 55.5 degrees in the case of the microstrip patch antenna.

Figure 4:
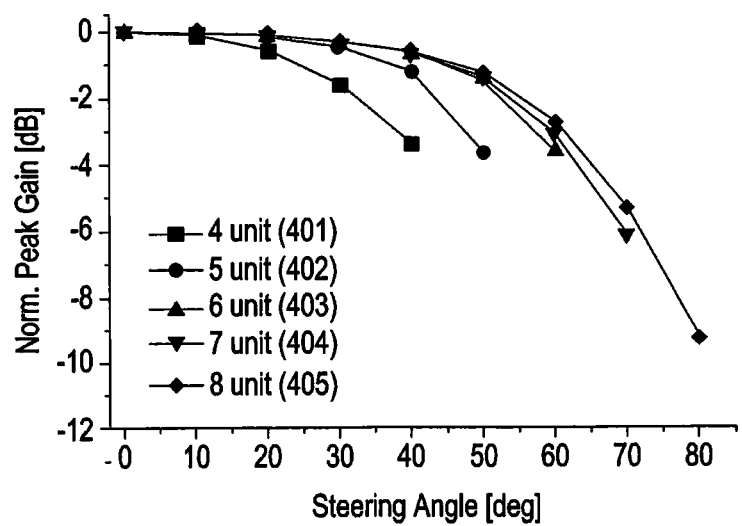
FIG. 4 is a view representing the steering characteristics of a meta-structure array antenna depending on the number of arranged antennas according to an embodiment of the disclosure.

FIG. 4 is a view representing the steering characteristics of a meta-structure array antenna depending on the number of arranged antennas according to an embodiment of the disclosure;

FIG. 4 represents a result obtained by comparing steering gains depending on an increase in the number of arranged meta-structure array antennas in a ground plane, which is a limited space having a size of 0.7 $\lambda 0 \times 2.8 \lambda 0$. Here, $\lambda 0$ is the length of a wavelength and may correspond to the speed/frequency of light. For example, when the speed of light is 300,000,000 [m/s] and the frequency is 5.8 [GHz], λ0 may be about 5.172 cm (=300,000,000 [m/s]/5,800,000,000 [1/s] =about 5.172 cm).

In FIG. 4, the square-marked graph 401 represents a change in the steering gain of an array antenna, in which the number of arranged antennas is four, depending on the steering angle. Similarly, the circle-marked graph 402 represents a change in the steering gain of an array antenna, in which the number of arranged antenna is five, the triangle-marked graph 403 represents a change in the steering gain of an array, in which the number of arranged antenna is six, the inverted-triangle-marked graph 404 represents a change in the steering gain of an array antenna, in which the number of arranged antenna is seven, and the rhombus-marked graph 405 represents a change in the steering gain of an array antenna, in which the number of arranged antenna is eight.

Here, the number of arranged antennas may encompass meta-structure array antennas having the same number of unit antennas on one axis (e.g., x-axis). For example, the meta-structure antennas arranged in structures of 4×1, 4×2, 4×3, etc., which exhibit the same characteristics when normalized on the basis of center gain, are all included in an array antenna, in which the number of arranged antennas is four.

According to the measurement result of FIG. 4, it may be confirmed that steering performance is improved even when the number of unit antennas is increased in a limited space.

That is, in the case of an existing microstrip array antenna, the size of the antenna is inevitably determined in consideration of the operating frequency. However, in the meta-structure array antenna of this disclosure, it is possible to adjust the resonance frequency depending on the designed structures of gap and vias in the patch plane regardless of the operating frequency of the antenna, and thus it is possible to drastically reduce the size of the antenna.

Figure 5:
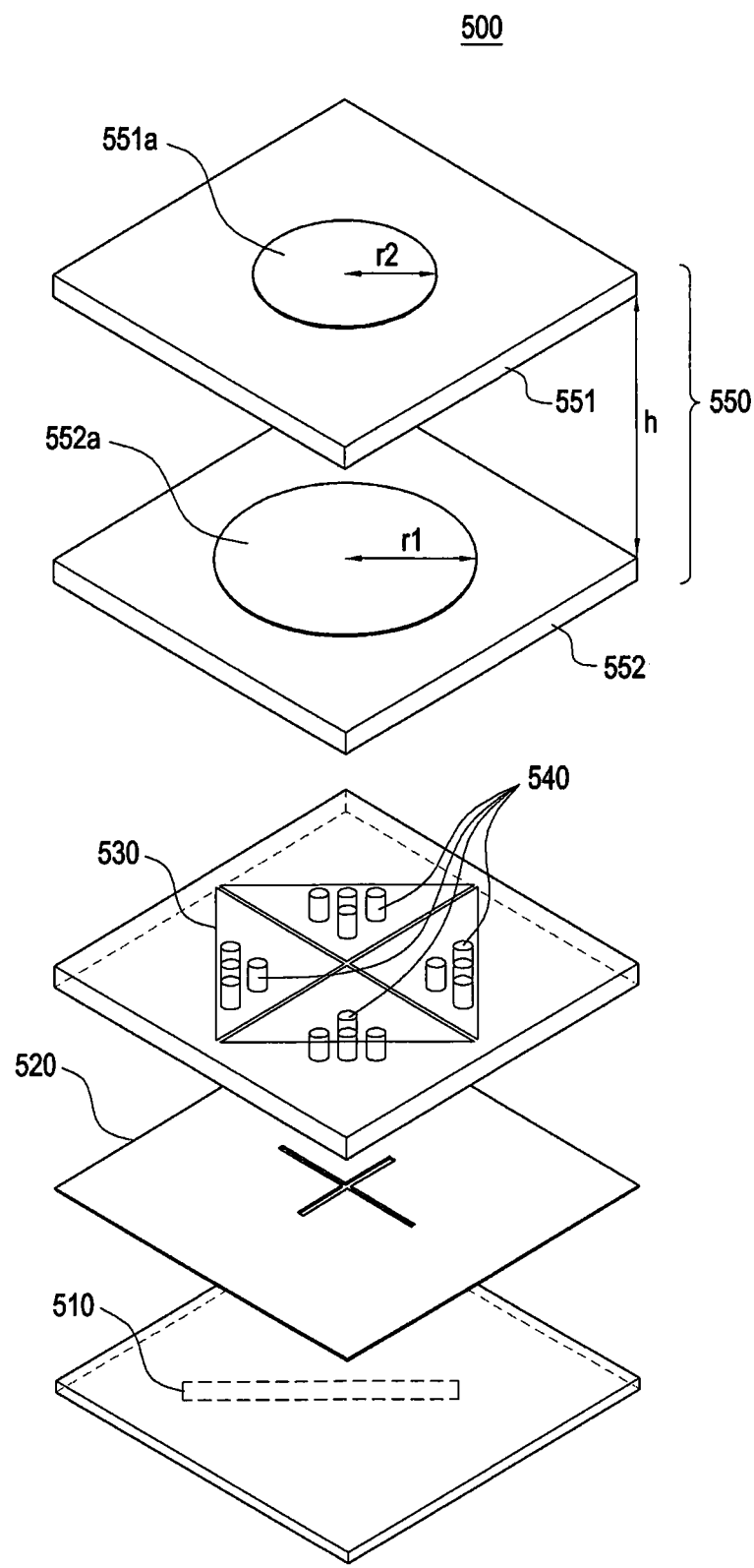
FIG. 5 is a view illustrating a meta-structure antenna including a superstrate according to an embodiment of the disclosure.

FIG. 5 is a view illustrating a meta-structure antenna 500 including a superstrate according to an embodiment of the disclosure.

In FIG. 5, a feed line 510, a ground plane 520, a patch plane 530, and a plurality of vias 540 correspond to the feed line 210, the ground plane 220, the patch plane 230, and the plurality of vias illustrated in FIG. 2, respectively, and thus redundant descriptions will be omitted.

In FIG. 5, a superstrate 550 may be provided above the patch plane 530 to adjust the phase and amplitude of the electromagnetic waves radiated from the patch plane 530 so as to radiate electromagnetic waves with improved directional gain. That is, the superstrate 550 may suppress the degradation in antenna gain caused by interference between electromagnetic waves radiated from the patch plane 530.

The superstrate 550 may be configured in two layers including a first cover 551 and a second cover 552 spaced apart from the first cover 551 by a predetermined distance. In this case, the phase and amplitude of the electromagnetic waves radiated from the patch plane 530 may be adjusted depending on the distance between the first cover 551 and the second cover 552.

In addition, a first pattern 551a and a second pattern 552a may be formed in the first cover 551 and the second cover 552, respectively. In this case, the phase and amplitude of the electromagnetic waves radiated from the patch plane 530 may be adjusted depending on the forms and sizes of the patterns.

The first pattern 551a and the second pattern 552a may be formed of, for example, a copper foil. In FIG. 5, the first pattern 551a and the second pattern 552a have a circular shape. However, it is natural that the first pattern 551a and the second pattern 552a may be designed in various shapes such as a square, an ellipse, a lattice, and a spiral in consideration of the phase and amplitude of the electromagnetic waves to be radiated. In addition, the shapes and sizes of the first pattern 551a and the second pattern 552a may be designed differently.

According to various embodiments, the length of one side of the superstrate 550 may be designed to be equal to the length of one side of the meta-structure antenna 500. For example, the length of one side of the superstrate 550 may be substantially equal to the length of one side of the ground plane 520.

In addition, when a plurality of meta-structure antennas 500 is provided to form a meta-structure array antenna, a plurality of superstrate patterns is repeatedly formed. Thus, the superstrate of this disclosure may be referred to as a periodically structured superstrate.

FIGS. 6A to 6F are views each representing a reflection coefficient and a transmission coefficient depending on the structure of the superstrate according to an embodiment of the disclosure.

When the superstrate is provided in order to adjust the phase and amplitude of electromagnetic waves, the superstrate may be designed in consideration of the measured values of a reflection coefficient and a transmission coefficient with respect to the superstrate.

That is, when the superstrate is configured depending on the results of FIGS. 6A to 6F in order to design an antenna having a desired reflection coefficient and transmission coefficient, each of the distance between the first cover and the second cover constituting the superstrate and the sizes of the patterns formed on the first cover and the second cover may be determined.

FIGS. 6A to 6F represent changes in reflection coefficient, transmission coefficient, and phase with respect to a unit superstrate, measured assuming that the superstrate has an infinite periodic structure.

Figure 6A:
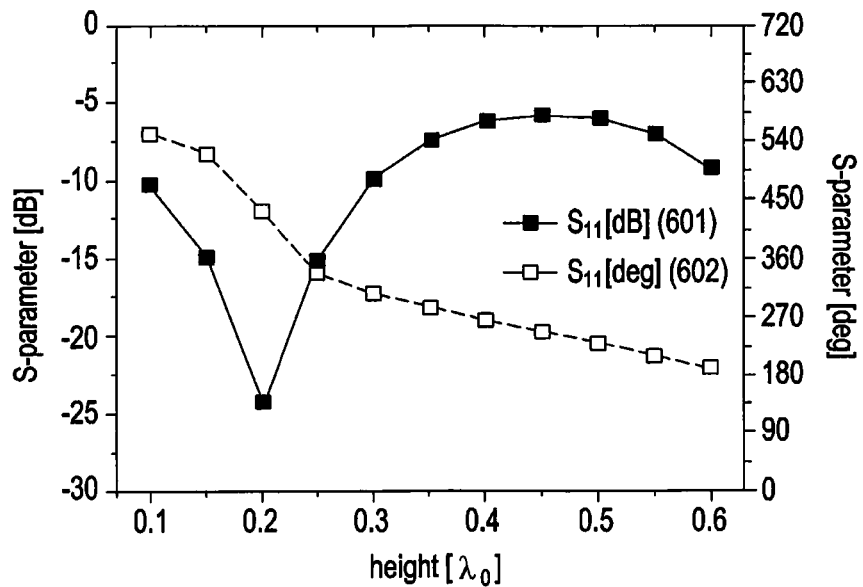
FIGS. 6A to 6F are views each representing a reflection coefficient and a transmission coefficient depending on the structure of the superstrate according to an embodiment of the disclosure.
Figure 6B:
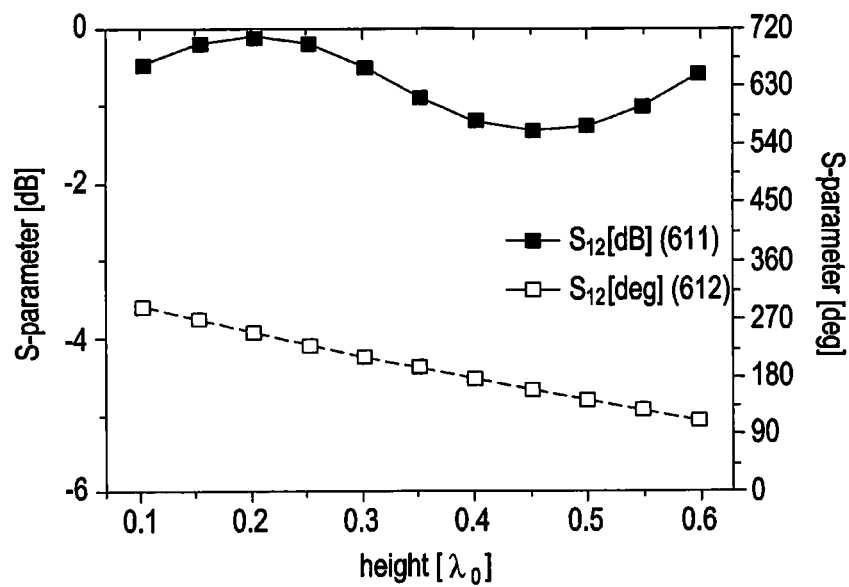

First, FIGS. 6A and 6B represent changes in reflection coefficient and transmission coefficient with respect to a superstrate depending on the distance between the first cover and the second cover of the superstrate.

The x axis in FIG. 6A represents h (h in FIG. 5), which is the distance between the first cover and the second cover, the y axis on the left represents the magnitude of the reflection coefficient with respect to the superstrate, and the y axis on the right represents the phase of the reflected waves with respect to the superstrate.

In this case, the solid line graph 601 represents the change in the magnitude of the reflection coefficient depending on the distance, and the dotted line graph 602 represents the phase change of the reflected waves depending on the distance.

In addition, the x axis of FIG. 6B represents the distance between the first cover and the second cover, the y axis on the left represents the magnitude of the transmission coefficient with respect to the superstrate, and the y axis on the right represents the phase of the transmitted waves with respect to the superstrate.

In this case, the solid line graph 611 represents the change in the magnitude of the transmission coefficient depending on the distance, and the dotted line graph 612 represents the phase change of the transmitted waves depending on the distance.

Referring to FIGS. 6A and 6B, h, which is the distance between the first cover and the second cover, may be determined from a value in the wide range of 0.3 λ0 to 0.6

λ0 in which a change in the magnitude of the reflection coefficient is small and the phase change of the transmitted waves is large.

Figure 6C:
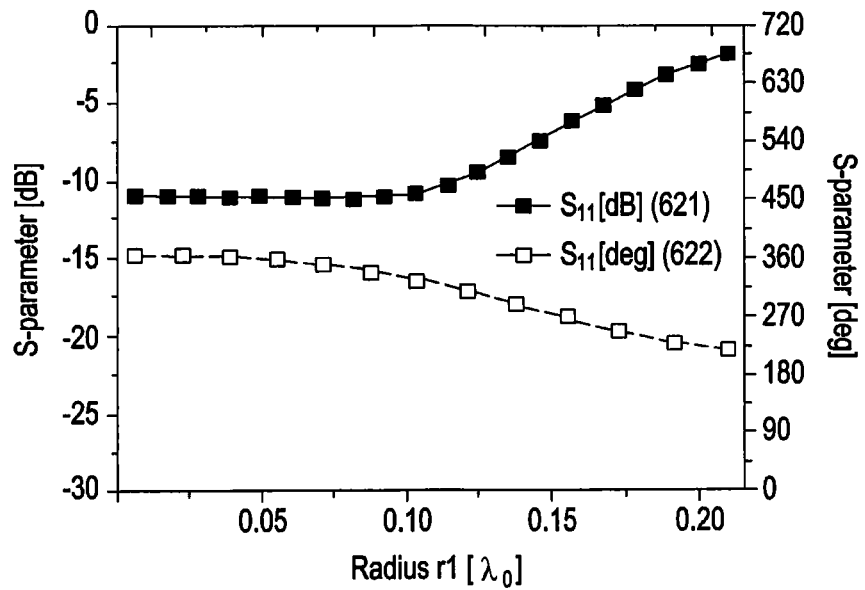
Figure 6D:
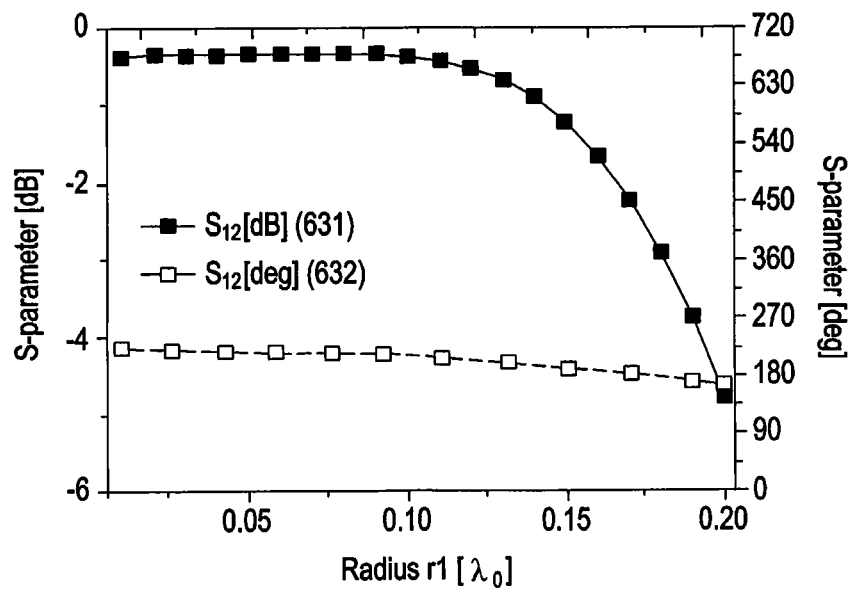

In addition, FIGS. 6C and 6D represent changes in reflection coefficient and transmission coefficient with respect to a superstrate depending on the size of the first cover positioned in the upper portion of the superstrate.

The x axis in FIG. 6C represents r1 (r1 in FIG. 5), which is the radius of the pattern formed on the first cover, the y axis on the left represents the magnitude of the reflection coefficient with respect to the superstrate, and the y axis on the right represents the phase of the reflected waves with respect to the superstrate.

In this case, the solid line graph 621 represents the change in the magnitude of the reflection coefficient depending on the radius, and the dotted line graph 622 represents the phase change of the transmitted waves depending on the radius.

In addition, the x axis of FIG. 6B represents the radius of the first cover, the y axis on the left represents the magnitude of the transmission coefficient with respect to the superstrate, and the y axis on the right represents the phase of the transmitted waves with respect to the superstrate.

In this case, the solid line graph 631 represents the change in the magnitude of the transmission coefficient depending on the distance, and the dotted line graph 632 represents the phase change of the transmitted waves depending on the distance.

Referring to FIGS. 6C and 6D, r1, which is the radius of the pattern formed on the first cover, may be determined from a value in the range of 0.1 λ0 to 0.2 λ0 in which changes in the magnitudes of the reflection coefficient and the transmission coefficient are large and the phase change of the transmitted waves is small.

Figure 6E:
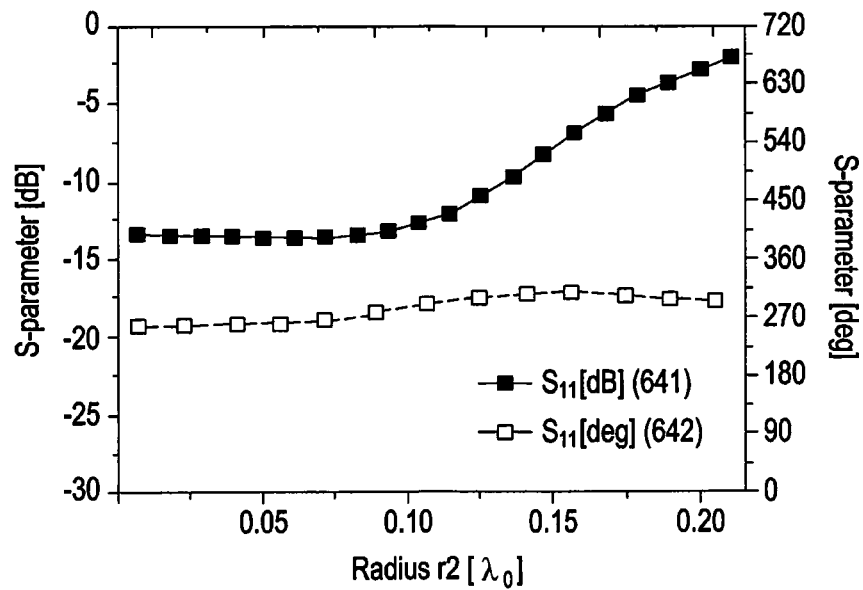
Figure 6F:
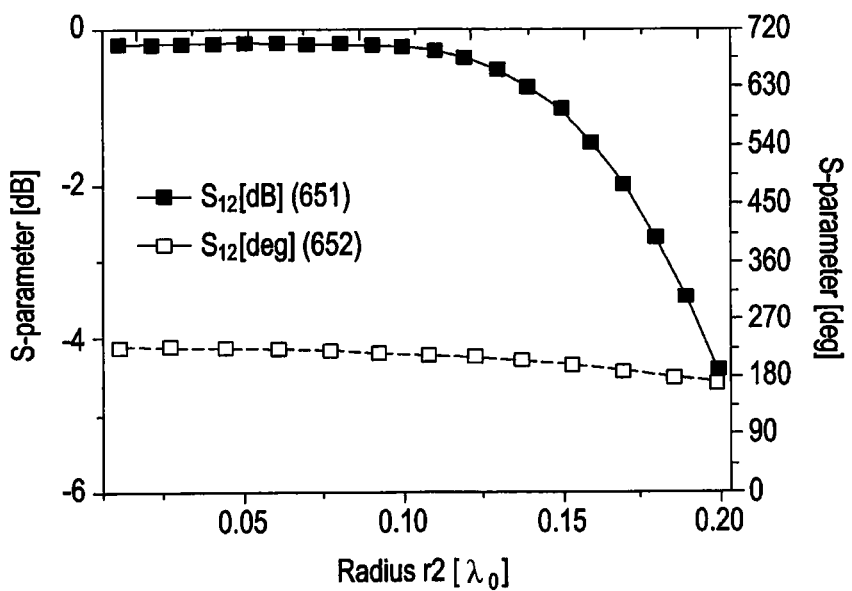

In addition, FIGS. 6E and 6F represent changes in reflection coefficient and transmission coefficient with respect to a superstrate depending on the radius r2 (r2 in FIG. 5) of the pattern formed on the second cover positioned in the lower portion of the superstrate. In this case, the second cover may be the cover located closer to the patch plane among the first cover and the second cover of the superstrate.

The x axis of FIG. 6E represents the radius of the second cover, the y axis on the left represents the magnitude of the reflection coefficient with respect to the superstrate, and the y axis on the right represents the phase of the reflected waves with respect to the superstrate.

In this case, the solid line graph 641 represents the change in the magnitude of the reflection coefficient depending on the radius, and the dotted line graph 642 represents the phase change of the transmitted waves depending on the radius.

In addition, the x axis of FIG. 6F represents the radius of the second cover, the y axis on the left represents the magnitude of the transmission coefficient with respect to the superstrate, and the y axis on the right represents the phase of the transmitted waves with respect to the superstrate.

In this case, the solid line graph 651 represents the change in the magnitude of the transmission coefficient depending on the distance, and the dotted line graph 652 represents the phase change of the transmitted waves depending on the distance.

Referring to FIGS. 6E and 6F, r2, which is the radius of the pattern formed on the second cover, may be determined from a value in the range of 0.1 λ0 to 0.2 λ0 in which changes in the magnitudes of the reflection coefficient and transmission coefficient are large and the phase change of the transmitted waves is small.

Figure 7:
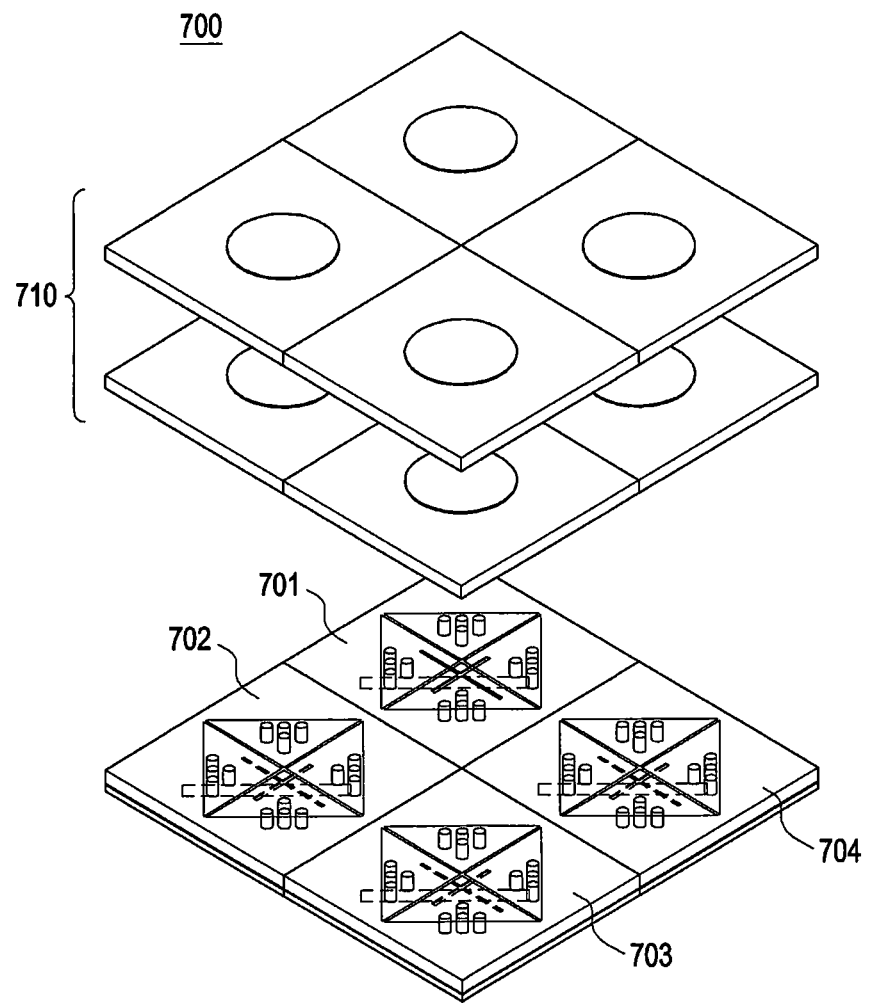
FIG. 7 is a view illustrating a meta-structure array antenna to which a superstrate according to an embodiment of the disclosure is applied.

FIG. 7 is a view illustrating a meta-structure array antenna to which a superstrate according to an embodiment of the disclosure is applied.

In a meta-structure array antenna 700 of FIG. 7, the meta-structure antennas 701, 702, 703, and 704 described above may be provided in a 2×2 array structure.

In this case, a superstrate 710 may be positioned above the meta-structure antennas 701, 702, 703 and 704 so as to adjust the amplitude and phase of a radiated pattern formed by the interference of sub-electromagnetic waves of each of the meta-structure antennas 701, 702, 703 and 704.

Meanwhile, FIG. 7 illustrates merely an example, and a meta-structure antenna to which superstrates of various arrangements are applied may be designed. For example, a meta-structure array antenna with a superstrate may include a plurality of meta-structure antennas in a linear array of 1×A, a planar array of A×B, or a 3D or circular array of A×B×C. In this case, the distance between each of the plurality of meta-structure antennas and the superstrate may be determined assuming that, for example, the transmitted waves have the same phase.

Figure 8:
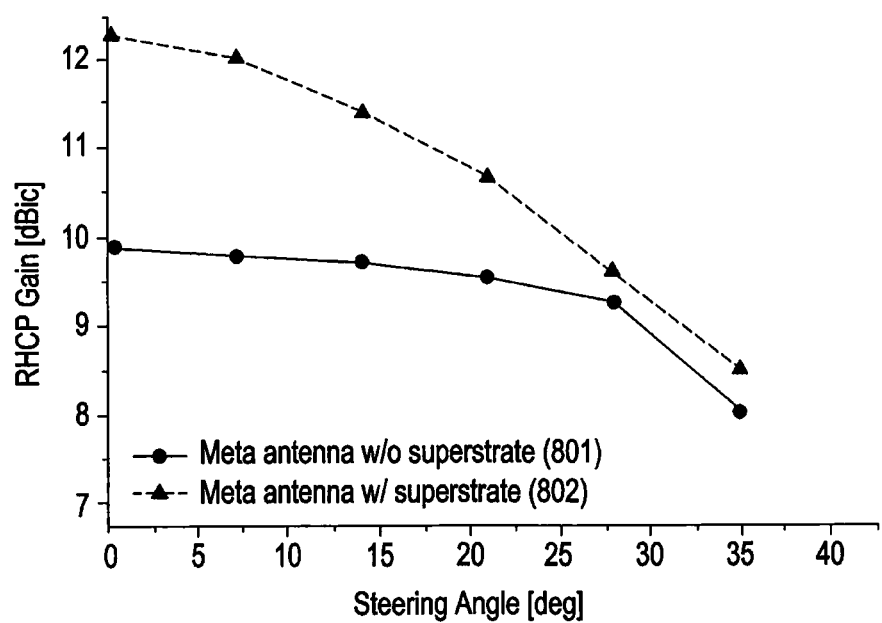
FIG. 8 is a view representing steering characteristics of meta-structure array antennas to which a superstrate according to an embodiment of the disclosure is applied.

FIG. 8 is a view representing the steering characteristics of meta-structure array antennas to which a superstrate according to an embodiment of the disclosure is applied.

In FIG. 8, the solid line graph 801 represents steering gain depending on the steering angle of a meta-structure array antenna to which a superstrate is not applied, and the dotted line graph 802 represents steering gain depending on the steering angle of a meta-structure array antenna to which a superstrate is applied.

In this case, the meta-structure array antenna to which a superstrate is applied may have a structure in which wavefronts of electromagnetic waves radiated through the superstrate may be implemented in an equiphase by adjusting the phase and amplitude of the reflected waves reflected from the superstrate.

In this case, it can be seen that the steering gain of a meta-structure array antenna to which a superstrate is applied is improved in performance by about 2.39 dBi compared to the steering gain of a meta-structure array antenna to which a superstrate is not applied.

Although embodiments of the disclosure have been illustrated and described above, this disclosure is not limited to the specific embodiments described above. Various modifications can be made by a person skilled in the art without departing from the gist of this disclosure as claimed in the claims, and these modifications should not be understood individually from the technical idea or prospect of this disclosure.

DESCRIPTION OF REFERENCE NUMERALS

210: feed line
220: ground plane
230: patch plane

The invention claimed is:
1. A meta-structure antenna comprising:
a feed line configured to feed a signal;
a ground plane including a cross-shaped aperture, the ground plane being configured to form circularly polarized waves based on a magnetic field induced by the signal;
a patch plane formed parallel to the ground plane, the patch plane being configured to radiate electromagnetic waves based on the circularly polarized waves;

a plurality of vias formed between the ground plane and the patch plane to produce zeroth-order resonance in the meta-structure antenna; and a superstrate a first cover and a second cover spaced apart from the first cover by a first distance, wherein the first cover includes a first pattern, and the second cover includes a second pattern facing in a direction which is equal to a direction in which the first pattern faces.

2. The meta-structure antenna of claim 1, wherein, when the patch plane is divided into a plurality of partial patch planes, numbers of one or more vias formed between respective partial patch planes and the ground plane are equal to each other.

3. The meta-structure antenna of claim 1, wherein the superstrate configured to radiate electromagnetic waves improved in directional gain by adjusting a phase and an amplitude of the radiated electromagnetic waves.

4. The meta-structure antenna of claim 3, wherein the first pattern and the second pattern, respectively, adjust the phase and the amplitude of the radiated electromagnetic waves.

5. The meta-structure antenna of claim 4, wherein the first pattern and the second pattern have a circular shape.

6. The meta-structure antenna of claim 4, wherein sizes of the first pattern and the second pattern are determined in consideration of a magnitude of a reflection coefficient with respect to the superstrate and a phase of reflected waves.

7. The meta-structure antenna of claim 4, wherein sizes of the first pattern and the second pattern are determined in consideration of a magnitude of a transmission coefficient with respect to the superstrate and a phase of transmitted waves.

8. The meta-structure antenna of claim 3, wherein the first distance between the first cover and the second cover is determined in consideration of a magnitude of a reflection coefficient with respect to the superstrate and a phase of reflected waves.

9. The meta-structure antenna of claim 3, wherein the first distance between the first cover and the second cover is determined in consideration of a magnitude of a transmission coefficient with respect to the superstrate and a phase of transmitted waves.

10. The meta-structure antenna of claim 1, wherein the patch plane includes a cross-shaped gap.

11. The meta-structure antenna of claim 10, wherein the cross-shaped gap in the patch plane is positioned to correspond to the cross-shaped aperture in the ground plane.

12. The meta-structure antenna of claim 1, wherein the cross-shaped aperture includes a plurality of slits orthogonal to each other.

13. The meta-structure antenna of claim 12, wherein the plurality of slits have different lengths such that the circularly polarized waves are formed.

* * * * *